UNITED STATES PATENT OFFICE.

EMIL NESTLER, OF BERGENFIELD, NEW JERSEY.

PROCESS OF RETREADING RUBBER TIRES AND PRODUCT THEREOF.

1,354,992.      Specification of Letters Patent.      Patented Oct. 5, 1920.

No Drawing.      Application filed March 29, 1920. Serial No. 369,680.

*To all whom it may concern:*

Be it known that I, EMIL NESTLER, a citizen of Germany, residing at Bergenfield, Bergen county, State of New Jersey, have invented certain new and useful Improvements in Processes of Retreading Rubber Tires and Product Thereof, of which the following is a full, clear, and exact description.

This invention relates to a process of retreading rubber tires, and has for its object to provide a method of retreading which will save considerable rubber and material and which can be quickly effected. Subject matter herein disclosed is claimed in my co-pending application Serial Number 409,055 filed September 9, 1920.

In the processes heretofore employed, so far as I am aware, it has been the practice to tear away the old worn tread and replace the same with a new tread, this involving time and loss of rubber.

In carrying out my improved process, instead of taking off the old and worn tread, I leave the old worn tread on the tire and apply a blue-flame torch thereto, that is to the portion to be retreaded, and heat it until the rubber is partially or wholly desulfurized. This decomposition leaves a sticky surface, which I cover quickly with a cement made of raw rubber mixed with carbon tetra chlorid, and a small quantity of sulfur. As soon as this cement dries (which occurs almost instantly), enough rubber is applied to make a new tread, and for this purpose I may use new rubber or old pieces of worn rubber treads. I then vulcanize the tire in the usual manner.

I find that by desulfurizing the old worn tread, the new rubber tread applied thereto will more firmly adhere than would otherwise be the case.

What I claim and desire to secure by Letters Patent is:—

1. A step in the process of retreading rubber tires, which consists in desulfurizing the part to be retreaded.

2. The process of retreading rubber tires, which consists in first desulfurizing the part to be retreaded, then applying a cement, composed of rubber, carbon tetra chlorid, and a small quantity of sulfur, and then applying the new tread thereto.

3. The process of retreading rubber tires, which consists in first desulfurizing the part to be retreaded, then applying a cement, composed of rubber, carbon tetra chlorid and a small quantity of sulfur, then applying the new tread thereto, and then vulcanizing the tire.

4. The process of retreading rubber tires, which consists in applying heat to the worn tread to remove the sulfur therefrom, then applying rubber cement thereto, then applying the new rubber tread and vulcanizing the same.

5. A worn rubber tire tread from which the sulfur has been removed, and a new rubber tread vulcanized thereon.

6. The process of retreading rubber tires which consists in applying heat to the worn tread until there is a change in the viscous state, then applying cementitious material thereto and vulcanizing to other rubber.

7. The process of retreading rubber tires which consists in applying a flame to the worn tread, then counteracting certain effects of the flame, then uniting with other rubber.

8. The process of retreading rubber tires which consists in treating the rubber at a decomposing temperature, applying cementitious material and other rubber and vulcanizing.

9. The process of retreading rubber tires which consists first in decomposing a part of the rubber, then restoring the decomposed element and uniting with other rubber.

Signed at New York city, N. Y., this 27 day of March, 1920.

EMIL NESTLER.

Witnesses:
EDWARD A. JARVIS,
CHARLES D. SPRING.